UNITED STATES PATENT OFFICE.

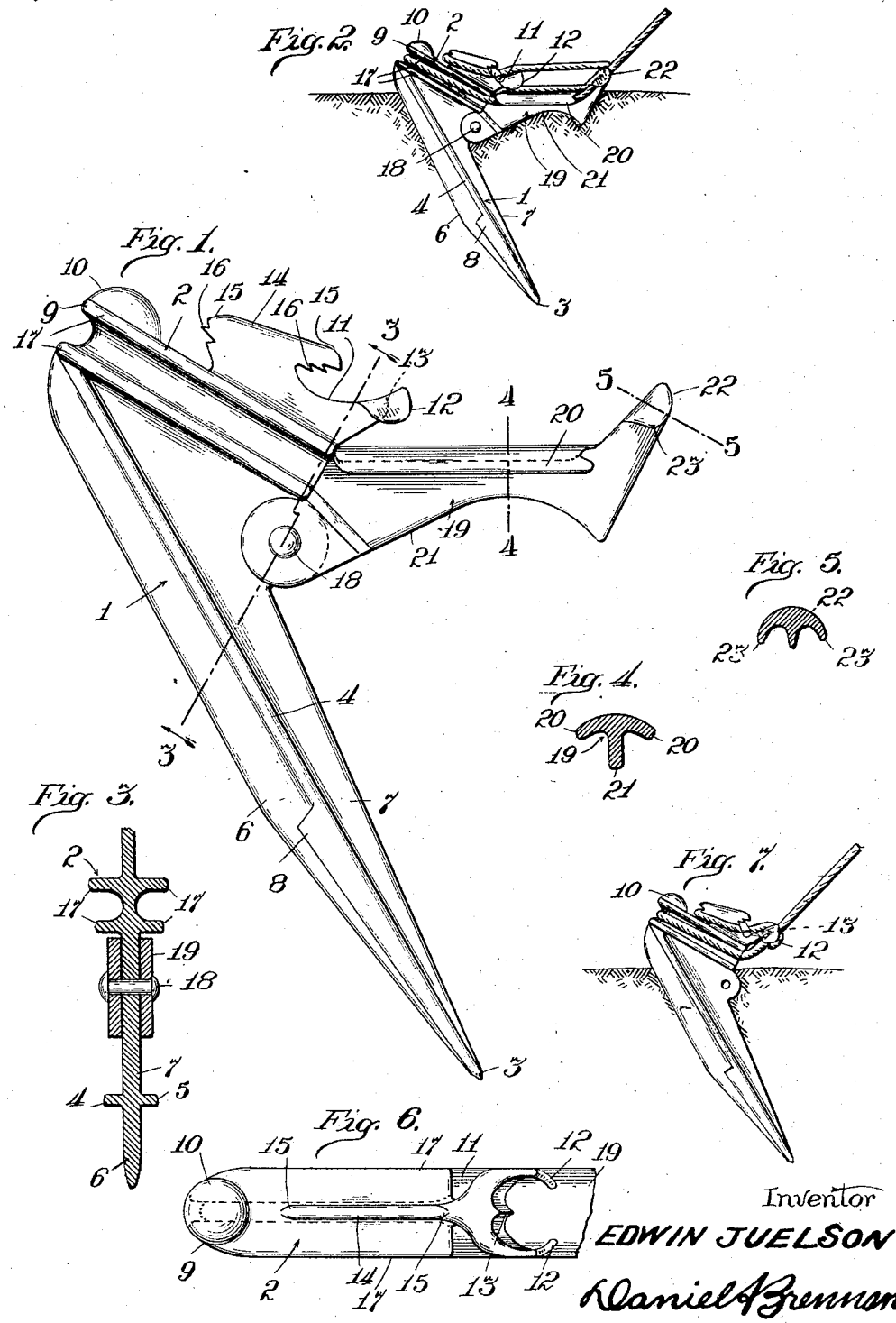

EDWIN JUELSON, OF CHICAGO, ILLINOIS.

TENT-STAKE.

1,304,779. Specification of Letters Patent. Patented May 27, 1919.

Application filed January 14, 1918. Serial No. 211,827.

*To all whom it may concern:*

Be it known that I, EDWIN JUELSON, a citizen of the United States, residing at Chicago, county of Cook, and State of Illinois, have invented certain new and useful Improvements in Tent-Stakes, of which the following is a specification.

This invention relates to improvements in stakes, and particularly to improvement in tent stakes.

An object of the invention is to provide a stake which can readily be driven into the ground and which is adapted to receive and hold a tent or other rope secured to the head of the stake.

Another object of the invention is to provide a stake of this character with a shank and a head portion, the head having holding projections or guideways for the tent or other rope. These guideways are arranged so that the upward pull on the rope produces a component of the pulling force at an angle to the axis of the stake.

Another object of the invention is to provide the head of a stake with a holding lug for a tent rope or the like, said lug being mounted on top of the head and having projections whereby a pull on the tent rope in any direction will not cause the rope to slip over the top of the projecting lug.

Another object of the invention is to provide the projecting portion of the stake with an additional guide or support for the rope, this additional member being pivoted to the stake proper, whereby a strong pull on the rope will have a tendency to swing said additional member into engagement with the stake proper, instead of withdrawing it in axial direction from the ground.

With these and other objects in view, embodiments of the invention have been described in the following specification and are illustrated in the accompanying drawings, wherein Figure 1 is a side elevation of a tent stake of this character, having a block pivotally mounted thereon;

Fig. 2 is a side elevation of the same stake with the rope secured to the head of the same;

Fig. 3 is a sectional view on line 3—3 of Fig. 1;

Fig. 4 is a sectional view on line 4—4 of Fig. 1;

Fig. 5 is a sectional view on line 5—5 of Fig. 1;

Fig. 6 is a top plan view of a portion of the stake;

Fig. 7 is a side elevation of a simplified tent stake while being positioned in the ground.

The tent stake comprises a shank 1 and a head 2. The shank preferably is pointed at its lower end, as indicated at 3, and has a plurality of ribs 4, 5, 6, and 7, which project at right angles to each other so as to resist torsional strains which may occur owing to a pull of the rope after the stake has been driven into the ground. A wedge-shaped projection 8 on one or more of the ribs, near the lower end of the stake, may afford additional holding power against withdrawal after the stake has been firmly driven in.

The head portion 2 of the stake preferably is arranged at an acute angle with respect to the axis of the shank 1 whereby the area of the cross section of the upper portion of the stake is considerably increased, a feature which is of advantage as it facilitates the operation of driving the stake into the ground. The heel 9 of this head portion 2 is at the end of the top of shank and may be provided with a suitable reinforcement or knob 10 to receive the blows, when the stake is being driven into the ground. The opposite end of the head 2 is provided with a bifurcated terminal portion 11, and the bight of this prong 12 has a slight central projection 13 located in the axis of the head.

The top surface of the head 2 carries an upwardly projecting lug 14 extending substantially in longitudinal direction of the head. The end surfaces 15 of the lug 14 are slanting inwardly, the base line of the lug being somewhat shorter than the top, and these end surfaces are provided with a plurality of projecting teeth 16, adapted to bite into the rope, which in the use of the stake is placed around; the teeth therefore act as means to prevent the rope from slipping about this lug.

Ribs 17 extending from the heel portion 9 to the front portion 11 of the head at the side surfaces of the stake and disposed substantially parallel to each other on both sides, serve as guiding means for the rope. When through the rope a force is applied having a tendency to pull the stake upwardly, this force owing to the downward slant of the guiding means which hold the rope will produce a component, which is substantially parallel to the direction of the ribs 17, and as these ribs again are at an acute angle to the axis of the stake, the pull on the rope will not have the same tendency as a pull in axial direction. This pull will have a tendency to rotate the stake in the ground about a point located near the heel portion 9 of the head of the stake, which heel is above the ground. The resistance of the soil against this pivotal movement of the stake naturally is much larger than the resistance of the soil against a longitudinal axial displacement of the stake, so that the danger of the removal of the stake by an excessive pull on the rope is decreased.

When desired, the rear edge of the head portion of the stake may be provided with an opening adapted to receive a pivot pin 18 on which a rope guiding shoe 19 is movably mounted. This pivotal shoe 19 is also provided on its upper surface with a pair of downwardly projecting ribs 20, as may be seen from the cross section shown in Fig. 4, and the pockets formed between the central portion 21 of this shoe and the overhanging ribs 20 serve as guiding means for the rope portion placed therein. This pivotal guiding shoe 19 has at its front end a terminal 22 with prongs 23 similar to the terminal portion 11. Owing to the provision of this pivotal shoe the leverage with which the rope pull acts on the stake is decreased, the pivotal point upon which the stake has a tendency to turn then coinciding with the pivot 18 of the shoe 19. The rear portion of the shoe 19 will be forced into engagement with the front portion of the head at the stake and the rope guideways 20 provided on the shoe 19 will then form a continuation of the guideways in the fixed head of the stake.

In using the stake without the shoe 19, Fig. 7, the stake is driven first into the ground either by pressure upon the heel of the head, which for this purpose is provided with the knob 10, or by a series of blows. One end of the tent rope is then slung about the projecting lug on top of the head. The other portion of the rope is trained forwardly, passed through the space between one prong 12 and the central point 13 of the head portion and then drawn rearwardly on one side of the head and under the guiding portion at that side. It is then turned forwardly on the heel 9, trained in the guiding portion on the other side of the head, passed through the space between the other prong 12 and horn 13 at the front portion, and fastened to the tent canvas or the like and properly adjusted so as to be kept taut. Even if a very strong pull is transmitted through the rope to the stake, the stake will not be pulled out of the ground, but will have a tendency to turn about a point which is located above the ground and as the soil to be displaced by this turning movement is firmly packed about the stake, the loosening of the stake will not easily take place.

In using the stake illustrated in Figs. 1 and 2, the rope, after having been slung about the projecting lug 10, is not passed through the fork at the front of this head, but is trained forwardly on top of the pivotal shoe 19 which is fastened to the stake, it is then slung through the fork at the front end of this pivotal shoe 19 and guided rearwardly to the heel portion 9 of the stake, then again turned forwardly and passed again through the fork at the front end of the pivotal shoe.

No matter which of these forms is used, the loose end of the rope will not only be held against slippage by the teeth of the projecting lug on top of the fixed head of the stake, but this loose end will also be tightly pressed against the stake by the loop or loops of rope formed on the top portion of the stake and confined by the guiding means thereon.

It is obvious that the material of which the stake and shoe may be formed can be selected in accordance with the purposes for which the stake is supposed to serve. Preferably, however, the stake as well as the shoe may be made of metal which combines considerable rigidity with a minimum of weight so as to facilitate the transportation of a number of stakes by one man and to permit the driving of the stake even into relatively hard ground without causing a bending of the stake.

I claim:

1. A stake for the attachment of a tent rope or the like, comprising a shank portion and a head portion disposed at an angle to the axis of the shank portion, the head portion having a projecting lug, and having means for guiding a rope at the sides of the head portion.

2. A stake for the attachment of a tent rope or the like, comprising a shank portion, a head portion disposed at an angle to the axis of the shank portion, and lateral guideways on the head portion for the rope.

3. A stake for the attachment of a tent rope or the like, comprising a shank portion and a head portion disposed at an angle to the axis of the shank portion, the head portion being provided with guideways for the rope, said guideways being disposed at an acute angle with respect to the axis of the shank portion.

4. A stake for the attachment of a tent rope or the like, comprising a shank portion and a head portion disposed at an angle to the axis of the shank portion, the head portion being provided with lateral guideways for the rope at opposite side surfaces of the head portion, said guideways being parallel to each other.

5. A stake for the attachment of a tent rope or the like, consisting of an integral shank portion and a head portion, the head portion being provided on opposite side surfaces with guideways for the rope, said guideways being disposed at an acute angle to the axis of the shank.

6. A stake for the attachment of a tent rope or the like, consisting of an integral shank portion and a head portion, the head portion having a heel at one end and a prong at the opposite end, said head portion extending substantially at an acute angle to the axis of the shank.

7. A stake for the attachment of a tent rope or the like, consisting of a shank portion, a head portion, and a lug on top of the head portion, the lug having end surfaces inclined at an angle with respect to the top edge of the lug so as to present undercut end walls of the lug, these end walls being provided with a plurality of teeth.

8. A stake for the attachment of a tent rope or the like, consisting of a shank portion and a head portion, the head portion being provided with a lug projecting from the top thereof upwardly, the end walls of the lug receding from the end points of the top edge of the lug in direction toward the root portion of said lug, and guideways disposed at an acute angle with respect to the axis of the shank and at both sides of the head portion.

9. A stake for the attachment of a tent rope or the like, consisting of a shank portion and an integral head portion disposed at an angle to the axis of the shank portion, the head portion having a heel at one end and a prong at the other end, the prong being provided with a central projection in its bight.

10. A stake for the attachment of a tent rope or the like, consisting of a shank portion having a plurality of ribs extending longitudinally with respect to the shank portion and disposed at angles of ninety degrees with respect to each other in cross section, and a head portion having a heel at one end and a prong at the other end, and guideways at opposite sides of said head portion connecting said heel and said prong.

11. A stake for the attachment of a tent rope or the like, comprising a shank portion, a head portion having a heel at one end and a prong at the other end, guideways at opposite sides of said head portion extending from said heel to said prong, and a lug projecting from said head portion between said heel and said prong.

12. A stake for the attachment of a tent rope or the like, consisting of a shank portion and a head portion disposed at an angle to the axis of the shank portion, and a rope guiding shoe movably mounted on the stake.

13. A stake for the attachment of a tent rope or the like, consisting of a shank portion, a head portion, a rope guiding shoe pivotally secured on said stake, and means on said shoe disposed at opposite sides thereof for guiding the rope at an angle with respect to the head and axis of the shank.

14. A stake for the attachment of a tent rope or the like, comprising a shank portion and a head portion, guideways at opposite sides of said head portion disposed at an angle with respect to the axis of the shank, a pivotal rope guiding shoe secured to the shank portion, and guideways on said shoe forming a continuation of the guideways on the head portion.

15. A stake for the attachment of a tent rope or the like, comprising a shank portion and a head portion, guideways at the head portion disposed at an angle with respect to the axis of the shank, a pivotal rope guiding shoe mounted on the shank of the stake, and guideways on said shoe forming an angular continuation of the guideways on the head portion.

16. A stake for the attachment of a tent rope or the like, comprising a shank portion and an integral head portion disposed at an angle to the axis of the shank portion, said head portion being provided with guideways at opposite sides, a rope guiding shoe pivotally mounted on the shank, guideways at opposite sides of said pivotal shoe, the guideways of the shoe being disposed at an angle different from the guideways of the head portion with respect to the axis of the shank.

17. A stake for the attachment of a tent rope or the like, comprising a shank portion and a head portion disposed at an angle to the axis of the shank portion, and a pivotal shoe mounted on the stake, guideways at opposite sides of said shoe, the front end of the pivotal shoe having a rope guiding prong.

In testimony whereof I affix my signature in the presence of two witnesses.

EDWIN JUELSON.

Witnesses:
BRENNAN WAHL,
DANIEL A. BRENNAN.